Figure 3:
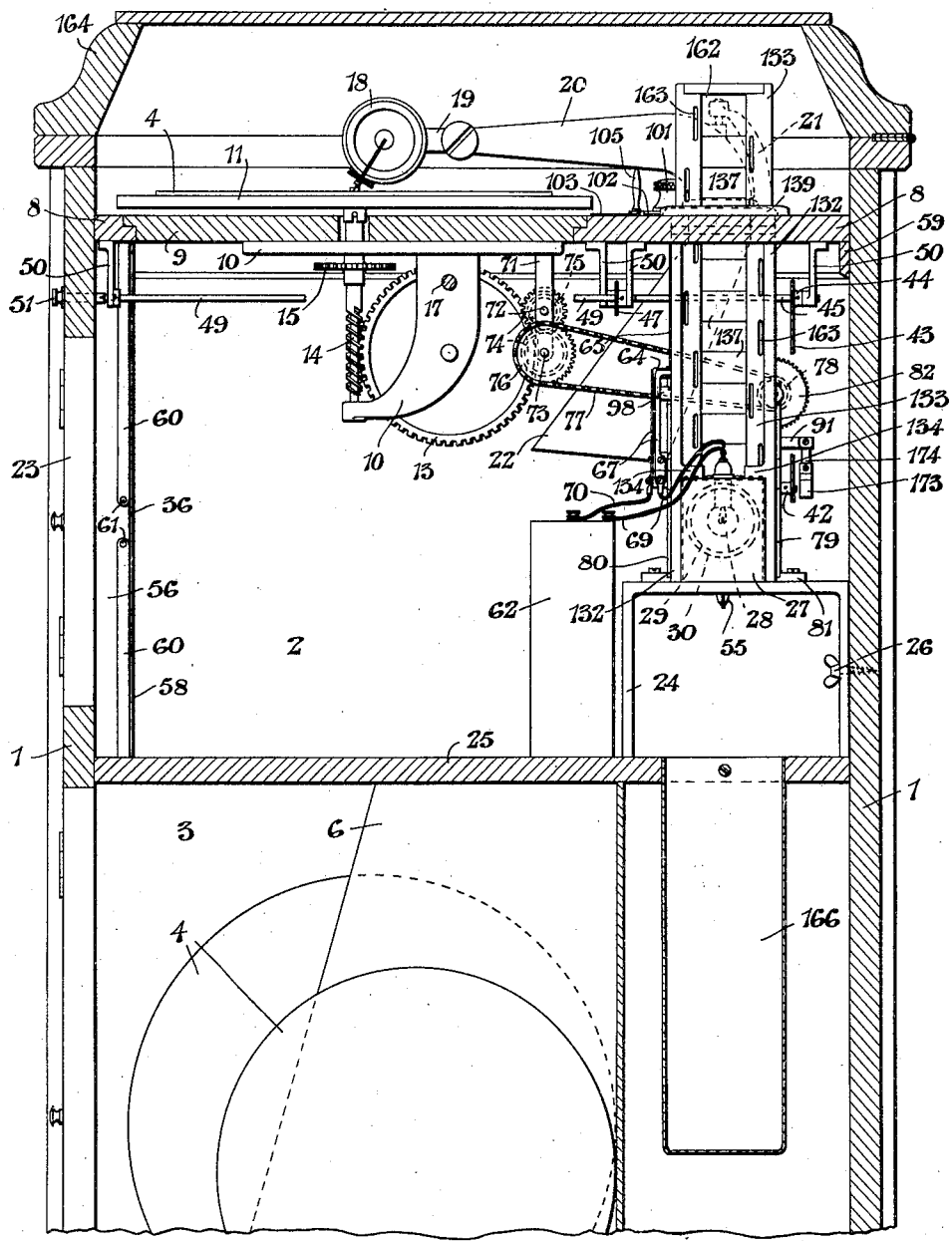

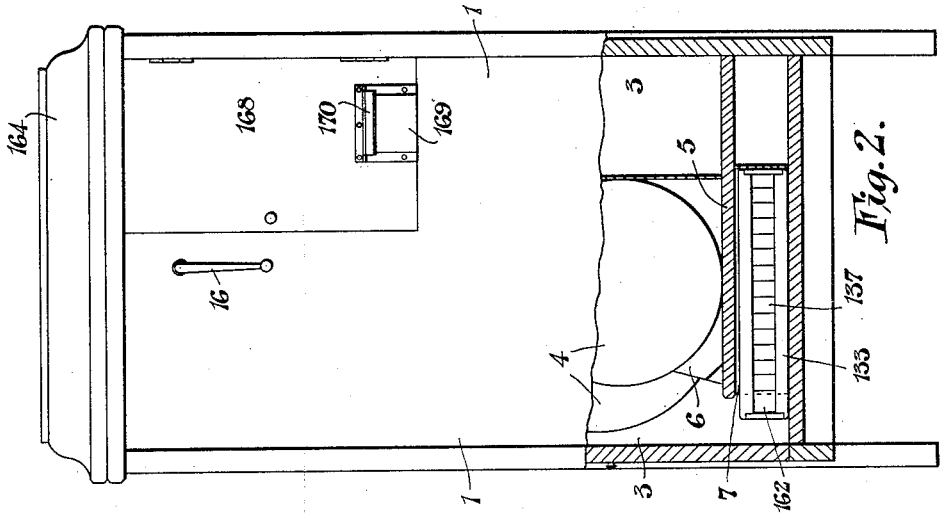

G. BOHN AND H. A. BREINING.
MACHINE FOR SYNCHRONOUSLY REPRODUCING SOUNDS AND PROJECTING PICTURES.
APPLICATION FILED FEB. 1, 1917.

1,432,273.

Patented Oct. 17, 1922.

6 SHEETS—SHEET 4.

Inventors
G. Bohn,
H. A. Breining.
By their Attorney
Lindley J. Murray

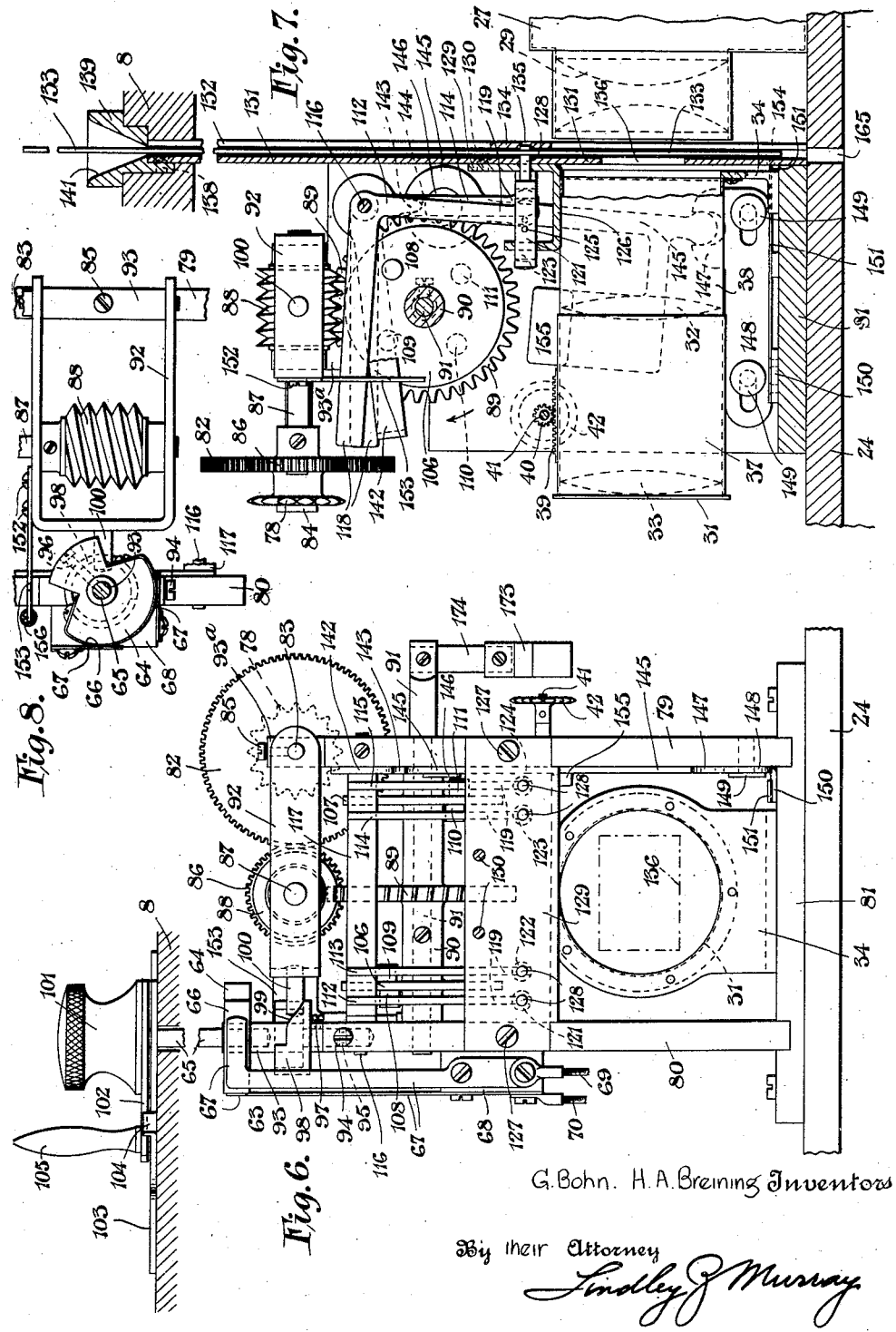

G. BOHN AND H. A. BREINING.
MACHINE FOR SYNCHRONOUSLY REPRODUCING SOUNDS AND PROJECTING PICTURES.
APPLICATION FILED FEB. 1, 1917.
1,432,273.
Patented Oct. 17, 1922.
6 SHEETS—SHEET 6.
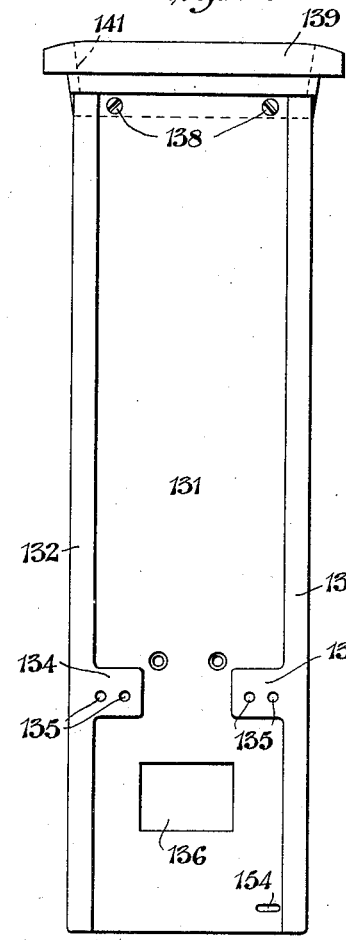
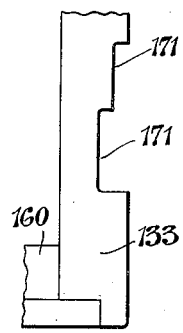
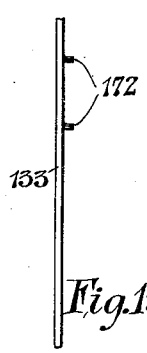
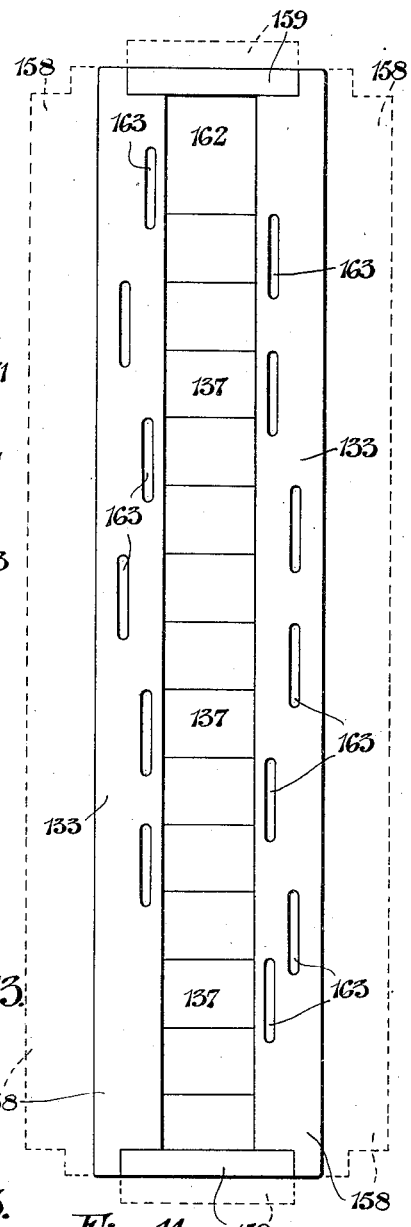
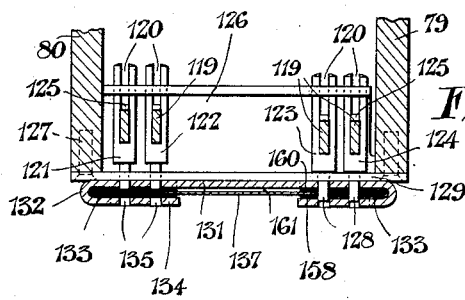
G. Bohn. H.A. Breining Inventors
By their Attorney
Lindley J Murray Patented Oct. 17, 1922.

1,432,273

UNITED STATES PATENT OFFICE.

GUSTAV BOHN AND HERMAN ALBERT BREINING, OF PHILADELPHIA, PENNSYLVANIA; SAID BREINING ASSIGNOR TO SAID BOHN.

MACHINE FOR SYNCHRONOUSLY REPRODUCING SOUNDS AND PROJECTING PICTURES.

Application filed February 1, 1917. Serial No. 146,032.

*To all whom it may concern:*

Be it known that we, GUSTAV BOHN and HERMAN ALBERT BREINING, both citizens of the United States of America, and both residing at Philadelphia, in the county of Philadelphia and State of Pennsylvania, have invented certain new and useful Improvements in Machines for Synchronously Reproducing Sounds and Projecting Pictures, of which the following is a specification.

This invention relates to machines or apparatus adapted to reproduce vocal, musical or other sounds and to synchronously exhibit or project photographic or other pictures corresponding to or illustrating the sounds reproduced.

The object of the invention is to provide an inexpensive and compact form of machine or apparatus arranged to exhibit or project still pictures illustrating or corresponding to the reproduced sounds, as distinguished from animated pictures, and to provide for the automatic regulation or control of the time intervals or periods during which the successive pictures are exhibited or projected so that the pictures corresponding to a particular series of sound reproductions, as contained on a sound record, are projected in a particular predetermined succession or relation, individual to the particular series of sound reproductions, such as to properly synchronize or relate the pictures to corresponding sound reproductions occuring during regular or irregular intervals. By the use of such a machine or apparatus it is possible to take or produce and to subsequently exhibit or project pictures most aptly illustrating the vocal, musical or other sounds reproduced, irrespective of the time intervals or periods during which the illustrated sound reproductions occur, whereby a much more effective, entertaining and interesting result is obtained than is the case when pictures are projected at regular time intervals. In other words instead of having of necessity to prepare pictures illustrating sound reproductions occuring during regular time intervals, it is possible to select particular sound reproductions which may most advantageously be illustrated from an entertaining or educational point of view, and by the use of the present machine or apparatus, to exhibit or project such pictures synchronously with the particular selected sound reproductions.

The machine or apparatus according to the invention is preferably designed to be entirely enclosed within a cabinet or casing similar to the usual gramophone or phonograph cabinet.

The invention consists in the novel parts, constructions, instrumentalities, combinations and improvements herein shown and described.

The accompanying drawings clearly illustrate one form of machine constructed according to the invention.

In these drawings:—

Figure 4:
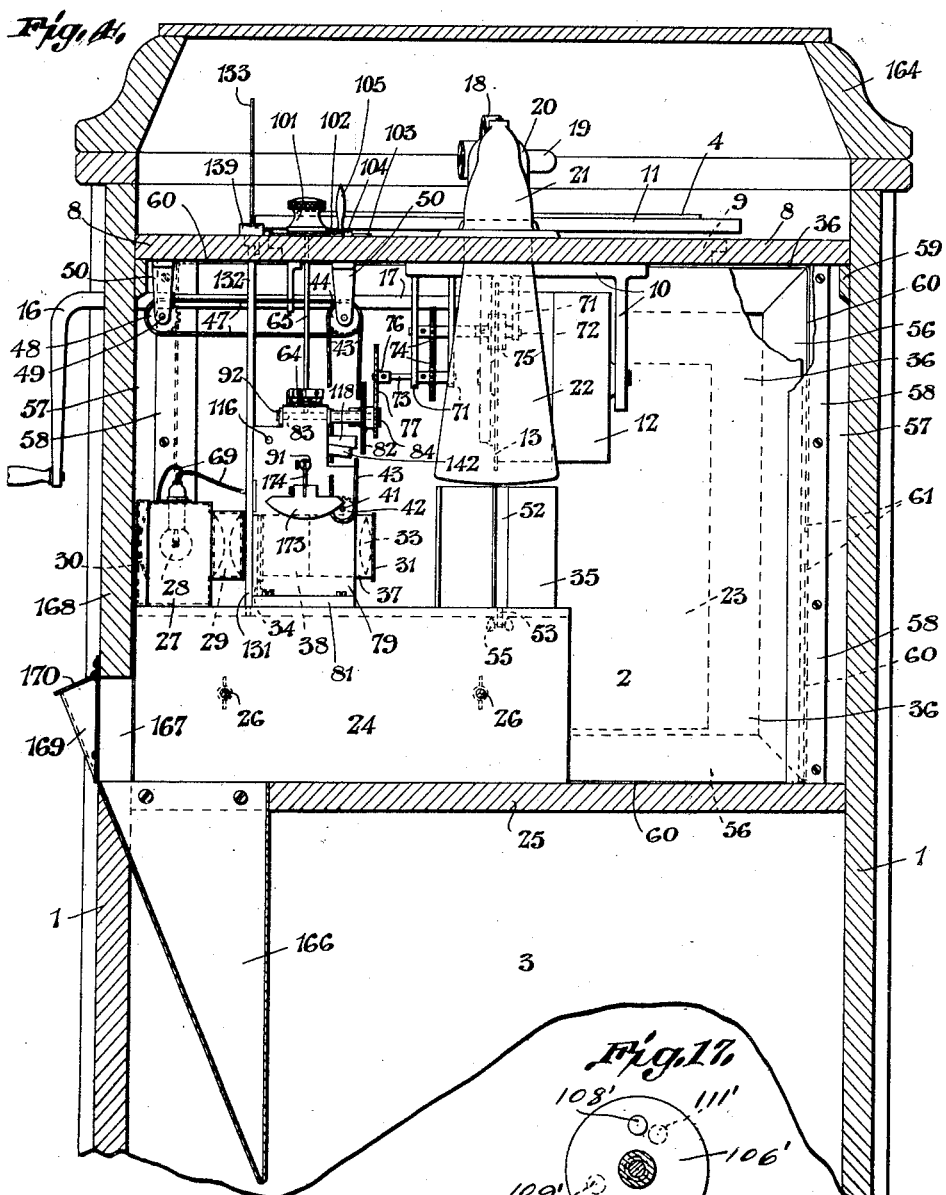
Figure 5:
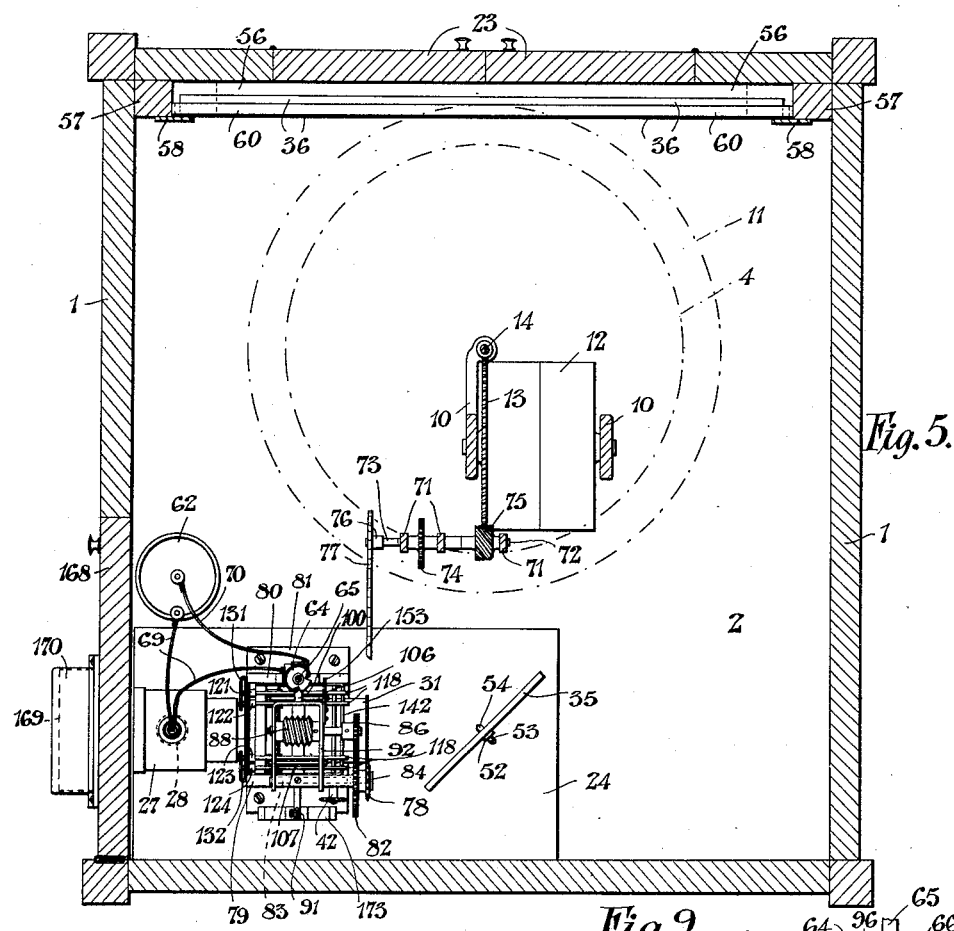
Figures 9, 10:
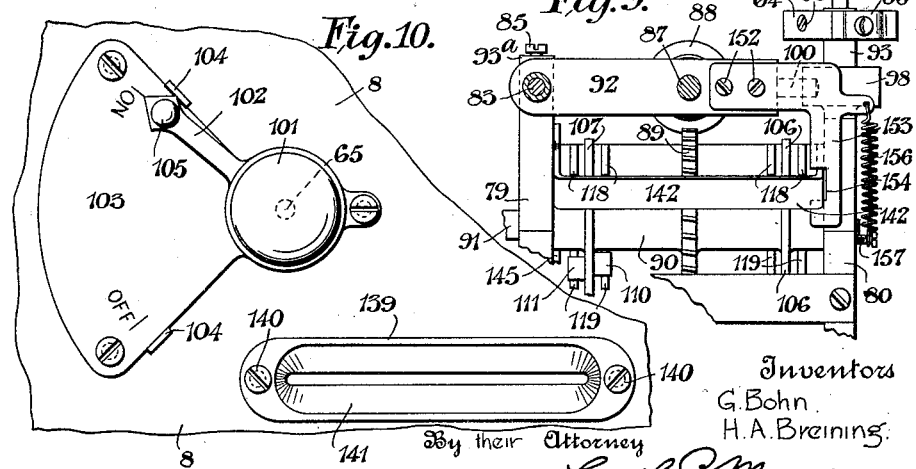

Figure 1 is a front elevation, with part broken away, of a cabinet or casing generally similar to the usual gramophone casing and adapted to enclose the machine according to this invention, Figure 2 is a side elevation, partly in section of the cabinet shown in Figure 1, Figure 3 is a sectional side elevation showing generally the picture exhibiting or projecting mechanism and the sound reproducing mechanism, Figure 4 is a rear sectional elevation showing the mechanism illustrated in Figure 3, Figure 5 is a sectional plan view of certain of the parts shown in Figures 3 and 4, Figure 6 is an enlarged view of the mechanism for controlling or regulating the projection of the pictures, with the picture slide and the guide therefor omitted, Figure 7 is a sectional view of the controlling mechanism looking toward the left in Figure 6, Figure 8 is a partial plan view of certain of the parts shown in Figure 6, Figure 9 is a rear elevation of certain of the parts shown in Figure 6, Figure 10 is a partial plan view of the top board of the cabinet showing those parts of the picture projecting mechanism located above said board, Figure 11 is a view of one of the picture slides, Figure 12 is a fragmentary view of a modified form of slide, Figure 13 is fragmentary edge view of a further modified form of slide, Figure 14 is a view of the guide for the picture slides, Figure 15 is a sectional fragmentary plan view illustrating the slide controlling plungers shown in Figures 6 and 7, Figures 16 and 17 are detail views of a modified arrangement of the pins on the cam discs.

The machine or apparatus illustrated in the drawings is shown as enclosed within a cabinet or casing 1, the sound reproducing mechanism and the picture projecting mechanism being arranged within the upper part 2 of the cabinet and the lower part 3 of said cabinet containing the sound records 4 supported on the shelf 5 and separated by the partition 6. Beneath the shelf 5 are arranged the slides carrying the pictures corresponding to or illustrating the sound records, the slides being located beneath the corresponding records and being separated from each other by the partitions 7. Thus any desired record and the corresponding picture slide may be correctly selected without difficulty. It is of course to be understood that the machine is not necessarily enclosed within such a cabinet or casing.

Referring more particularly to Figures 3 and 4, it will be seen that the top board 8 of the cabinet is provided with the usual removable section 9 and this removable section carries a casting or bracket 10 which supports the mechanism for driving the record turntable 11. This mechanism as illustrated comprises the usual spring motor enclosed within and tending to rotate the casing 12, which is provided on its exterior surface with the spiral gear 13, meshing with the worm spindle 14. This spindle is supported in suitable bearings in the bracket 10 and is connected to rotate the turntable 11 in the usual way, and it may be equipped with a spiral gear 15 arranged to drive the usual governor mechanism (not shown). The motor driving mechanism may be wound up by means of the usual handle 16 and winding spindle 17, and any suitable or usual means may be provided for stopping and starting the rotation of the turntable.

18 indicates the sound reproducer, which may be of any usual or desired construction, and is shown as carried by the usual goose neck 19 pivotally mounted on the taper sound arm 20 which is swingingly carried by the taper arm bracket 21 of usual construction. The sound arm 20 communicates with a sound tube 22 carried by the top board 8 and arranged to direct the sound into the upper part 2 of the cabinet away from the mechanism located therein, and in the general direction of the front of the cabinet. The front wall of the cabinet is provided with the usual doors 23, which are opened while the records are being played and the pictures exhibited. Obviously the form of sound reproducing mechanism shown is merely chosen for the purpose of illustration, as any other suitable or usual mechanism may be employed.

The picture projecting mechanism is shown as mounted upon a bracket or table 24 which rests upon the partition 25 between the upper and lower parts of the cabinet, and is secured in place by means of winged screws 26 screwed into the rear wall of the cabinet. The projecting mechanism as illustrated comprises a casing 27 secured to the bracket 24 in any suitable manner, and into which extends a suitable source of illumination, such as an electric lamp 28, the casing being provided with a condensing lens 29 and with a reflector 30. The pictures, as will be fully described hereinafter, are successively registered or positioned between the condensing lens 29 and the projecting tube 31, which carries the usual lenses 32 and 33 and is shown as being carried by a bracket or support 34, secured to a frame member 81 hereinafter referred to. The rays of light from the projecting tube 31 are received by a mirror 35, arranged as shown at an angle of substantially 45 degrees to the axis of the tube, and are directed by this mirror onto a screen 36 shown as located immediately in the rear of the front wall of the cabinet.

The projecting tube 31 is shown as comprising two telescoping parts 37 and 38 which are relatively adjustable to move the lens 33 toward or away from the mirror 35, for the purpose of properly focusing the picture upon the screen 36. As illustrated the adjusting means for the projecting tube comprises a rack 39 on the tube part 37, which rack meshes with a pinion 40 secured to a spindle 41, mounted in the frame members 79 and 80 hereinafter referred to, and to which spindle is also secured a sprocket wheel 42. A chain 43 passes around the sprocket 42 and around another sprocket 44 secured to a spindle 45, and this spindle carries a second sprocket 46 connected by a chain 47 with a sprocket 48 on a third spindle 49. The spindles 45 and 49 are supported in brackets 50 carried by the top board 8 of the cabinet and the spindle 49 is rotatable by means of a knob 51 extending through the front wall of the cabinet and detachably connected to the spindle in any suitable way.

The mirror 35 is illustrated as adjustably supported by the table or bracket 24, and for this purpose the mirror has secured to the back thereof a bar 52 terminating at its lower end in a threaded portion 53 which extends through a slot 54 in said table, this threaded portion being equipped with a winged nut 55 by means of which the mirror may be firmly clamped in any adjusted position.

The screen 36 may be of any suitable material and may be mounted in any desired manner. As illustrated the screen is in the form of a sheet of linen or other fabric mounted on a frame 56, shown in Figures 3, 4 and 5. The frame 56 is held in place against the front wall of the cabinet, between side pieces 57 and between the top board 8 and the partition 25, by means of guiding and retaining members 58 secured to said side pieces and overlapping the sides of the frame. The frame may be placed in position and removed therefrom by removing the top board 8 and sliding the frame upwardly or downwardly between the guiding members 58 and the front wall of the cabinet, the top board 8 when in place being supported by strips 59 or by other suitable means. The screen may be secured to the frame 56 in any suitable manner, and is shown as held in place on said frame at its upper and lower edges by means of three-sided gripping members 60 each of which is pivoted at 61 to opposite sides of the frame. To position the screen on the frame, the upper edge thereof may be placed over the upper edge of the frame and gripped thereon by the upper gripping member 60 and then the screen is tightly stretched across the frame and around the lower edge thereof and gripped against said lower edge by the other gripper.

As illustrated the source of illumination for the projecting mechanism is in the form of an incandescent electric lamp 28, and current may be supplied to this lamp from any suitable source, such for example as the battery 62. The supply of current to the lamp is controlled by a switch mechanism 63, the movable part 64 of which is secured to an operating spindle 65 more fully referred to hereafter. The movable switch part 64 comprises a block of insulating material which carries a strip 66 of conducting material, adapted to co-act with a pair of contact strips 67, 67 which are carried by a block of insulating material 68, secured to the frame member 80. The lamp terminals are connected respectively by wires 69 with one terminal of the battery 62, and with one of the contact strips 67, and the other battery terminal is connected by wire 70 with the other contact strip. Thus when the switch part 64 is in the position shown in the drawings the lamp circuit is completed and the lamp is lit, and when the operating spindle is turned in a counter-clockwise direction through substantially 90 degrees, the strip 66 is moved out of contact with one of the contact strips 67 and the lamp circuit is broken.

It will be understood from the description above given that when the operating spindle is moved into the position shown in the drawings, the lamp 28 will be lit and the picture which is registered or positioned between the condensing lens 29 and the projecting tube 31 will be projected onto the mirror 35 and will be reflected thereby onto the screen 36, and the sizes of the lenses are preferably such that the picture thrown onto the screen will be of the same size as the aperture left in the front wall of the cabinet when the doors 23 are opened. By suitably adjusting the mirror 35 the picture may be accurately framed within said aperture, and by rotating the spindle 49 by means of the knob 51, the lens 33 may be adjusted relatively to the mirror so as to secure the correct definition of the picture.

It is of course to be understood that the form of the projecting mechanism shown in the drawings is only chosen for the purposes of illustration and that the invention is not to be considered as in any way limited to the particular form of mechanism shown, nor to the particular location thereof in the cabinet, as both the form and location of this mechanism may be changed as desired.

The mechanism for regulating or controlling the registration or positioning of the pictures between the condensing lens and the projecting tube will now be described. This mechanism, which is illustrated most clearly in Figures 6-9 and 15, may be driven by any suitable motor driving mechanism, and is illustrated as being driven from the motor mechanism which drives the record turntable 11, although it is to be understood that this is not necessarily the case.

Referring to Figures 3, 4 and 5, it will be seen that brackets 71 extending downwardly from the main bracket 10 support spindles 72 and 73 which are connected by meshing gears 74, and that the spindle 72 has secured to it a spiral pinion 75 which meshes with and is driven by the spiral gear 13 on the casing 12 of the spring motor. The spindle 73 has secured to it a sprocket wheel 76 which is connected by a chain 77 with a sprocket 78 of the regulating or controlling mechanism. This mechanism is mounted in a framework comprising side members 79 and 80 suitably secured to a base member 81 which is in turn secured by screws or other means to the table or bracket 24. The sprocket 78 is rigidly secured to a gear wheel 82 and the sprocket and gear are loosely arranged on a spindle 83 mounted at the upper part of the side member 79, the gear and sprocket being held in place by the head 84 on the spindle and the latter being secured in position on the side member 79 by the screw 85. The gear 82 meshes with a smaller gear 86 secured to a spindle 87 to which is also secured a worm 88, and this worm, when the operating spindle 65 is in the position shown in the drawings, meshes with a worm wheel 89 secured to a sleeve 90 which is in turn secured to a shaft 91 mounted in bearings in the side members 79 and 80.

The worm spindle 87 is supported in bearings in a frame or yoke 92 which is pivotally mounted on the spindle 83, this yoke being maintained in position by the upstanding portion 93ª of the side member 79, through which portion the spindle 83 passes.

Mounted in a vertical socket in the other side member 80 is a short spindle 93 which is rotatably secured in said socket by means of a screw 94 extending into a groove 95 in said spindle. The end of the operating spindle 65 is secured in a socket in the upper end of the spindle 93 by means of a screw 96 which also serves to secure the movable switch part 64 to the spindle 93 and thus to the operating spindle 65. Secured to the spindle 93 by means of a screw 97 is a cam 98, the cam surface 99 of which co-acts with a pin 100 extending from the inner end of the yoke member 92. The cam surface 99 is of such form that when the operating spindle 65 and spindle 93 are in the positions shown in the drawings the yoke 92 is in its lowermost position and the worm 88 is in driving engagement with the worm wheel 89, but when the operating spindle is turned in a counter-clockwise direction, through substantially 90 degrees, which movement results in the breaking of the lamp circuit as previously described, the cam surface 99 acts on the pin 100 and turns the yoke member about the spindle 83 so as to raise the yoke and lift the worm 88 out of engagement with the worm wheel 89, thus breaking the driving connection between the motor driving mechanism and the regulating or controlling mechanism. Movement of the operating spindle 65 in the reverse direction will obviously return the worm 88 into driving engagement with the worm wheel 89, and will also complete the lamp circuit so that the lamp 28 is lit.

The operating spindle 65 extends upwardly through the top board 8 and is provided above said board with a knurled head 101 by means of which the spindle may be turned. The head 101 is preferably provided with an indicating arrow or finger 102 which may co-operate with suitable marks on a plate 103 in order to indicate the condition of the regulating or controlling mechanism. (See Figure 10). The plate 103 is secured by screws or the like to the top board 8, and preferably has upstanding lugs 104 adapted by engagement with the finger 102 to limit the extent of movement of the operating spindle, and the finger 102 may have an upstanding projection 105 by means of which the operating spindle may also be turned.

Referring again to the sleeve 90 which as stated is secured to the shaft 91, it will be seen from Figures 6 and 7 that this sleeve has secured to it in addition to the worm wheel 89, two cam discs 106, 107, the disc 106 carrying two pins 108 and 109 on opposite sides thereof, and the disc 107 also carrying two pins 110 and 111 on opposite sides thereof. The four pins 108—111 are adapted to co-act with four tripper levers 112, 113, 114 and 115 all of which are pivotally mounted on a spindle 116 which is supported at its ends in the side members 79 and 80, and is provided with spacing sleeves 117 to hold the tripper levers in properly spaced relation. Each tripper lever comprises a horizontal arm 118 which is adapted to be engaged by the corresponding pin 108—111, and a vertical arm 119 which at its lower end extends into the slotted portion 120 of the corresponding one of a series of plungers 121, 122, 123 and 124, the arm 119 being adapted to move the plunger in one direction by engagement with the end of the slotted portion thereof and in the other direction by engagement with a pin 125 extending across the slotted portion. The weight of the arms 118 of the tripper levers normally tends to move the plungers 121—124 to the right in Figure 7.

The arrangement of the pins 108—111 on the respective cam discs 106, 107 is such that the pins successively engage the arms 118 of the corresponding tripper levers 112—115 after successive quarter revolutions of the shaft 91. Thus, referring particularly to Figures 6, and 7, when the shaft 91 commences to rotate in the direction of the arrow in Figure 7, the pin 109 on disc 106 will engage the tripper lever 113 after a slight movement of the shaft, then the pin 110 on disc 107 will engage the lever 114 after one quarter of a revolution of the shaft, the pin 111 on disc 107 will engage the lever 115 after two quarter revolutions of the shaft, the pin 108 on disc 106 will engage the lever 112 after three quarter revolutions of the shaft, and the pin 109 will again engage the lever 113 after a complete revolution of the shaft, the pins successively engaging and actuating the corresponding tripper levers in this order so long as the shaft 91 is rotated. The engagement of a pin 108—111 with the arm 118 of a tripper lever results in raising this arm and moving the lower end of the arm 119 to the left in Figure 7, and the arm 119 by engagement with the pin 125 also moves the corresponding plunger in the same direction. The plungers 122, 123, 124 and 121 are thus successively retracted to the left in Figure 7 in the order given.

The plungers 121—124, as will be clearly seen from Figures 7 and 15, are slidably mounted in a channel shaped bar 126 which extends between and is secured by screws 127 to the side members 79 and 80. The ends 128 of the plungers are reduced in diameter and extend through corresponding apertures in the part 129 of the bar 126, the shoulders so produced on the plungers limiting the movement thereof by engagement with said part 129.

Secured to the bar 126 by means of screws 130, and thus located between the condensing lens 29 and the projecting tube 31, is a guide 131 for the picture slides, the guide consisting of a plate 131 the side edges 132 of which are curved to form channels in which the picture slide 133 is guided as shown in Figures 7 and 15. Opposite to the plungers 121—124, the edges 132 are provided with extensions 134, and the reduced portions 128 of the plungers extend through apertures 135 in the guide plate 131 and into similar apertures 135 in said extensions 134, when the plungers are in their most advanced positions, the plungers when in such advanced positions extending across the space through which the picture slide 133 passes. The guide plate 131 is provided with an aperture 136, the central point of which lies on the axis of the condensing lens 29 and of the projecting tube 31, this aperture being of substantially the same size as the pictures 137 carried by the picture slides. The guide 131 is secured at its upper end by means of screws 138 to an apertured plate 139 which in turn is secured by screws 140 to the upper side of the top plate 8, the guide being lowered into position through an aperture in said top plate and being secured in position by the screws 130 and 138. The aperture in the plate 139 is flared upwardly at 141 so as to facilitate the insertion of the picture slides into the guide channels of the guide plate.

It will be noted from Figures 7 and 9 that a yoke or frame 142, which is pivotally mounted on the spindle 116, extends beneath the ends of the arms 118 of the several tripper levers 112—115, and one arm of this yoke is provided with a nose or extension 143 which extends into a recess 144 in a lever 145 pivoted on a pin 146 secured in the side member 79. The lever 145 at its lower end engages the forked portion 147 of a slide 148 mounted upon guide pins 149 also secured in the side member 79. The slide 148 is provided with lugs 150 to the outer one of which is secured by screws or the like a flat strip 151 which normally occupies the position shown in Figure 7.

The yoke 92 which carries the worm 88 has secured thereto by screws 152 an arm 153 (see Figures 8 and 9) the lower end of which is recessed at 154 to receive the adjacent arm of the yoke 142, so that when the operating spindle 65 is turned to break the lamp circuit and to raise the yoke 92 by means of the cam 98, the arm 153 also raises the yoke 142, which in turn raises all of the arms 118 and retracts all of the plungers 121—124, and by means of the nose 143 swings the lever 145 to move the slide 148 to the right in Figure 7 to project the strip 151 through an aperture 154 in the guide plate 131 into the path traversed by the picture slides. The strip thus forms a stop to hold a picture slide subsequently inserted in the machine until the plungers 121—124 are allowed to advance to control the movement of the picture slide as will shortly be described, and this strip is preferably made of resilient or slightly elastic material so as to cushion the fall of a picture slide, if the same should be allowed to drop into its initial position. The movement of the slide 148 to the right may be assisted by suitably weighting the lever 145 as at 155. It will be obvious that movement of the operating spindle 65 in the direction to light the lamp 28 and to lower the yoke 92, results in a lowering movement of the yoke 142 which allows the weight of the arms 118 to advance the plungers 121—124, and which causes the retraction of the strip 151 to release the picture slide, the movements of which are then controlled by the said plungers. Although the yoke 92 may be moved into its lower position by the action of gravity, it is preferred to provide a spring 156 for this purpose, this spring being connected at one end to the arm 153 and at its other end to a screw 157 screwed into the side member 80. (See Figures 8 and 9).

The picture slide is illustrated most clearly in Figure 11, and is composed of any suitable non-fragile material. It may be made up from a metallic blank of the form shown in dotted lines in this figure, the side portions 158 of this blank being bent over on the body portion of the blank and the upper and lower portions 159 then being also bent over onto said body portion. The body portion 160 is slotted or cut away at 161, the width of the slot being the same as the width of the pictures 137, which, it will be seen from Figure 15 are gripped between the body portion 160 and the portions 158 of the slide. The slide is adapted to receive at 162 a label or the like bearing a title similar to that of the corresponding sound record. Instead of making the slide from a metallic blank, it may be made from a blank of any other suitable non-fragile material or composition of matter of the form shown in full lines in Figure 11, thus avoiding the bending over of the side and end portions of the blank as in the metallic form just described.

The picture slide as illustrated in Figure 11 is provided with a plurality of slots 163 cut through the body portion 160 and side portions 158 of the slide, the slots being arranged in four lines lengthwise of the slide, so that when the picture slide is inserted in the machine the four lines of slots will be in alinement with the four plungers 121—124.

The slots 163 are cut in a predetermined relation depending upon the particular time intervals in the playing of the sound record during which the successive pictures are to be projected onto the screen, the arrangement of the slots necessarily varying on each slide. A description will be given of the movement through the machine of the particular slide illustrated in Figure 11 and this description will make quite clear the operation of the controlling and regulating mechanism.

The picture slide is inserted into the guide channels of the guide 131, through the flaring aperture in the plate 139, after raising the usual hinged lid 164 of the cabinet, and as the operating spindle 65 will be in the "off" position, in which the plungers 121—124 are all retracted, the slide will move downwardly in the guide channels until stopped by the projecting end of the strip 151. This strip 151 is so located that when the slide is supported thereon, the upper end of the lowest slot 163 and the lower end of the next slot are in alinement with the ends 128 of the plungers 123 and 124, so that when the operating spindle 65 is turned into the "on" position, and all of the plungers 121—124 are advanced the plungers 123 and 124 will pass through the two slots mentioned, and the slide, due to the retraction of the strip 151 will fall a short distance until the plunger 123 engages the upper end of the lowest slot 163. This will hold the slide with the first or lowermost picture exactly registered with the aperture 136 in the guide 131, and as the lamp is lit when the operating spindle is turned to the "on" position, this picture will be projected onto the screen 36 in the manner previously described. As a blank or unslotted portion of the picture slide is positioned opposite the plungers 121 and 122, these plungers will be held by the slide in partially advanced positions as clearly shown in Figures 7 and 15.

In determining the period of operation of the operating spindle 65, the turntable is released by the usual means and the needle or the like of the reproducer inserted in the record groove in the usual manner, and the operating spindle is turned to the "on" position immediately the first sound is reproduced, thus ensuring the simultaneous commencement of the sound reproduction and picture projection, and of the operation of the regulating or controlling mechanism.

When the shaft 91 commences to rotate, the pin 109 engages the lever 113 and the plunger 122 is retracted but this does not effect the position of the picture slide as the latter is not at this time held by the plunger 122. When the shaft 91 has moved another quarter of a revolution however, the pin 110 engages the lever 114 and retracts the plunger 123 and this releases the picture slide which falls until stopped by the plunger 124 engaging the upper end of the second slot 163. This registers the second picture with the aperture 136 and this picture is projected onto the screen, and at the same time the lower end of the third slot 163 registers with the plunger 122 which advances into said slot. The table 24 is slotted at 165 to allow the picture slide to pass therethrough. After a further quarter revolution of shaft 91 the pin 111 acts on lever 115 to retract plunger 124 and the slide again falls until stopped by pin 122 engaging the upper end of the third slot 163. Thus the third picture is projected and the fourth slot is brought into register with the plunger 123 which passes into said slot. After another quarter revolution of shaft 91, plunger 121 is retracted, but this does not effect the position of the picture slide, which is not released until after a further quarter revolution of the shaft at which time the plunger 122 is released and the slide drops until stopped by the pin 123 engaging the upper end of the fourth slot 163. This registers the fourth picture and the plunger 122 is again advanced and enters the fifth slot 163. The plunger 123 is released after a further quarter revolution of shaft 91 and the slide again drops until stopped by plunger 122 in the fifth slot and the fifth picture is projected, while plunger 124 passes into the sixth slot 163. The plunger 122 is retracted after three-quarters of a revolution of shaft 91 and the slide drops to register the sixth picture, its movement being limited by the plunger 124 in the sixth slot, while the plunger 121 passes into the seventh slot.

Following out the arrangement of the slots 163 shown in Figure 11, and the sequence of operation of the plungers, it will be clear that the plungers 124, 122, 123, 121, 123 and 122 will successively engage in the eighth to the thirteenth slots 163, and that the plungers 124, 121, 124, 122, 123, 121 and 123 will be successively retracted after successive half, quarter, three-quarter, half, quarter, half, and half revolutions of the shaft 91, the picture slide falling after the retraction of each of these plungers so as to register successively the seventh to the thirteenth pictures.

The picture slide is held with the thirteenth picture in registering position by the plunger 122 engaging the upper end of the thirteenth slots and when this plunger is retracted after a further three quarter revolution of the shaft 91, the slide is completely released and falls into a pocket 166 carried by the partition 25, from which pocket it may be removed through an opening 167 in a door 168 hinged to the side wall of the cabinet, the opening 167 being closed by means of a casting 169 having a hinged lid 170 which is raised to remove the slide.

The rotation of the turntable 11 is stopped by the usual means and the projecting mechanism and the controlling or regulating mechanism thrown out of action by turning the operating spindle to the "off" position.

The gearing between the spring motor casing 12 and the shaft 91 is preferably so proportioned that the record turntable makes forty revolutions to each revolution of the shaft, so that with the machine illustrated the pictures would be projected during varying time periods, the record turntable rotating ten, twenty or thirty revolutions during such time periods. It is not however essential to retain these proportions and they may be varied as desired. Moreover it is not essential that the plungers 121—124 should be retracted after successive quarter revolutions of the shaft 91, as more or less plungers might be provided, retractable at less or greater fractions of a revolution of said shaft. Figures 16 and 17 illustrate a modified arrangement of the pins on the cam discs adapted to retract the plungers at less and greater fractions than one quarter of a revolution of the shaft 91. In these figures the cam discs, which are mounted in the same manner as the discs illustrated in Figure 6, are respectively designated 106′ and 107′. The pin 108′ on the left hand side (Figure 17) of the disc 106′ is assumed to be in position to operate the corresponding lever 112 and the direction of rotation is indicated by the arrow. The pin 109′ on the right hand side of disc 106′ is spaced from the pin 108′ a distance somewhat greater than a quarter of a revolution. The pin 110′ on the left hand side of disc 107′ is spaced slightly less than a quarter of a revolution from the pin 109′ and the pin 111′ on the right hand side of disc 107′ is spaced somewhat less than half a revolution from the pin 110′. The pin 108′ is spaced from the pin 111′ a distance somewhat less than $\frac{1}{8}$ of a revolution of the shaft. By this arrangement, assuming that the arrangement of the slots in the picture carrying member is such as to select the plunger corresponding to the pin 109′ immediately following the selection of the plunger corresponding to the pin 108′, the picture carrying member will be held between the retraction of the respective plungers an interval corresponding to slightly greater than a quarter of a revolution of the shaft 91. If the plunger selected should be that corresponding to the pin 110′ instead of that corresponding to the pin 109′, the period between retraction of the plungers will be slightly greater than one half a revolution and, further, if the plunger selected should be that corresponding to the pin 111′ the period between retraction of the plungers will correspond to a little more than $\frac{7}{8}$ of a revolution of the shaft 91. If the plunger corresponding to pin 108′ should be selected immediately following the selection of the plunger corresponding to pin 111′ the time interval will correspond to a little less than $\frac{1}{8}$ of a revolution but if the plunger corresponding to the pin 109′ should be selected the time interval will correspond to somewhat more than $\frac{3}{8}$ of a revolution. By this arrangement of the pins on the discs, therefore, a greater variety of time intervals is obtainable between the projection of succeeding pictures. As a further modification the same number of plungers and cam discs might be retained, with an increase in the number of pins on each disc, there being for example four pins on each disc, arranged so that the plungers are retracted at successive one-eighths of a revolution of the shaft. The essential requirement is that the sequence of operation of the plungers and the arrangement of the slots in the picture slide shall be such that the said slide is released to successively register the pictures carried thereby after time periods of such lengths as to properly co-relate or synchronize the pictures projected with sound reproductions occurring during predetermined rotational movements of the sound record.

In Figure 12 a modified form of picture slide is shown in which notches 171 cut into the side edges of the slide take the place of the slots 163, the plungers 121—124 being suitably spaced to cooperate with these notches. The figure shows two notches corresponding to the two lowermost slots 163. Figure 13 shows another modified form of slide in which projections 172 on the rear of the slide take the place of the slots 163, the plungers 121—124 being adapted to engage beneath the projections and to be retracted therefrom to successively release the slide. The figure shows two projections corresponding with the two lowermost slots 163.

It will be understood that there is a slot 163 or notch 171 or projection 172 for each picture carried by the slide 133 and that the lowermost slot in each slide is located so that one of the plungers 121—124 will engage therein when the slide is released by the retraction of the strip 151, to hold the slide with the first picture in registering position, the particular plunger with which the slot registers being determined by the time period or fraction of rotation of the shaft 91, during which the said first picture is to be projected. It is also pointed out that the shaft 91 is provided with a weight 173 which operates, when the worm 88 is moved out of engagement with the worm wheel 89, to return the shaft 91, the sleeve 90 and the cam discs 106, 107 secured thereto, from the position to which they have been rotated to the initial or starting position, which is that shown in Figure 7, so that the cam discs always start their rotation from the same position and one particular plunger is always the first to be retracted. In the machine illustrated this plunger is the plunger 122, but this is not of course essential. The weight 173 is carried by a flexible strip 174 which is secured to the shaft 91, this strip ensuring that the weight will always operate to return the shaft as it will prevent the weight from stopping at a dead centre immediately above the axis of the shaft, the weight always swinging over the dead centre.

It will be seen that by disconnecting the handle 16 from the spindle 17 and the chain 77 from the sprocket 76 or 78, the removable section 9 of the top board may be removed with the record driving mechanism attached, in the usual manner, and that by disconnecting also the knob 50 and the chain 43 from the sprocket 42, and removing the screws 96 and 130, the entire top board 8 may be removed to allow the insertion or removal of the screen 36 and its frame 56. Further, by opening the door 168 in the side wall of the cabinet the mechanism may be inspected and adjusted, and by removing the screws 26, disconnecting the chains 43 and 77 from the sprockets 76 and 42, and by disconnecting and raising the guide 131 and operating spindle 65, the table 24 and the mechanism carried thereby, as well as the battery 62 may be removed bodily from the machine.

The pictures carried by the slide 133 may be photographs or prepared in any other suitable manner, and may be in the form of a continuous film or may be separate from each other.

It will be noted from the description given that the operation of the operating spindle 65 when moved to the off position, switches off the light, retracts the plungers 121—124, projects the strip 151, disconnects the worm 88 and worm wheel 89, and due to such disconnection resets the cam discs 106, 107. On the reverse movement of the operating spindle, the light is switched on, the strip 151 is retracted, the plungers 121—124 are advanced, and the worm 88 and worm wheel are re-connected.

It will be understood that while the form of machine illustrated has been described in some detail in order to clearly set forth the operation thereof, the invention is by no means limited to this particular form, as the details of construction may be varied in many ways without departing from the scope of the invention.

What we claim and desire to secure by Letters Patent is:—

1. A machine of the character described, comprising in combination, picture projecting mechanism, a member carrying a plurality of pictures and movable to bring said pictures in succession into register with said mechanism, a series of members adjacent the path of movement of said member, means on said picture carrying member positioned with respect to said series of members to select said members in a predetermined sequence to limit the successive movements of said picture carrying member, and means for operating said members to permit said successive movements.

2. A machine of the character described, comprising in combination, picture projecting mechanism, a member carrying a plurality of pictures and movable to bring said pictures in succession into register with said mechanism, a plurality of members tending to move into co-acting relation with the picture carrying member to limit the successive movements thereof and normally prevented from such movement by said member, means on said member operating at successive movements thereof to permit movement of said members in a selected sequence into said coacting relation, and means for moving said members out of such co-acting relation to permit the successive movements of said member.

3. A machine of the character described, comprising in combination, picture projecting mechanism, a member carrying a plurality of pictures and movable to bring said pictures in succession into register with said mechanism, a plurality of members adapted to be moved in a predetermined sequence into co-acting relation with said member to hold the same against movement for successive time intervals, means on said picture carrying member for determining the duration of said time intervals, and means for moving said members in sequence out of said co-acting relation to permit the successive movements of said member.

4. A machine of the character described, comprising in combination, picture projecting mechanism, a member carrying a plurality of pictures and movable to bring said pictures in succession into register with said mechanism, a plurality of members adjacent the path of movement of said member, means positioned on said picture carrying member to successively selectively engage said members to limit the successive movements of said member and to determine the duration of the successive engagements and means for moving said members out of engagement with the first means to permit the successive movements of said member.

5. A machine of the character described, comprising in combination, picture projecting mechanism, a member carrying a plurality of pictures and movable to bring said pictures in succession into register with said mechanism, a plurality of members adapted to co-act with said member to limit successive movements thereof, means for moving said members at predetermined time intervals out of co-acting relation with said member to permit the successive movements thereof, and means on the picture carrying member for determining the duration of said time intervals.

6. A machine of the character described, comprising in combination, picture projecting mechanism, a member carrying a plurality of pictures and movable to bring said pictures in succession into register with said mechanism, a plurality of members adjacent the path of movement of said members, means on said picture carrying member for selecting said members in a particular sequence individual to said member, means operating to move the members selected by the first means in said sequence into position to limit the successive movements of said member, and means operating to move the selected members in selected sequence out of limiting position to allow said successive movements.

7. A machine of the character described, comprising in combination, sound reproducing means, picture projecting mechanism, a member carrying a plurality of pictures and movable to bring said pictures in succession into register with said mechanism, a plurality of members movable into position to engage said member to limit the successive movements thereof, means operable in timed relation to the sound reproducing means for moving said members in regular sequence after equal time intervals out of position to engage said picture carrying member, and means on said picture carrying member operating to select said members to limit the successive movements of said picture carrying member in a sequence differing from the first mentioned sequence of operation of said members.

8. A machine of the character described, comprising in combination, sound reproducing means, picture projecting mechanism, a member carrying a plurality of pictures and movable to bring said pictures in succession into register with said mechanism, a plurality of members tending to move into co-acting relation with the picture carrying member to limit the successive movements thereof and normally prevented from such movement by said member, means on said member operating at successive movements thereof to permit movement of said members in a selected sequence into said co-acting relation, and means movable in timed relation to the sound reproducing means for operating said members in regular sequence after equal time intervals to permit said movements of the picture carrying member.

9. A machine of the character described, comprising in combination, sound reproducing means, picture projecting mechanism, a member carrying a plurality of pictures and movable to bring said pictures in succession into register with said mechanism, a plurality of members adjacent the path of movement of said members, means on said picture carrying member for selecting said members in an irregular sequence individual to said member, means operating to move the members in said selected irregular sequence into positions to limit the successive movements of said member, and means movable in timed relation to the sound reproducing means for operating said members in regular sequence after equal time intervals to permit the said successive movements.

10. A machine of the character described, comprising in combination, sound reproducing means, picture projecting mechanism, a member carrying a plurality of pictures and movable to bring said pictures in succession into register with said mechanism, a plurality of members adjacent the path of movement of said member, a plurality of engaging means on said picture carrying member adapted in succession to engage with said members and to determine the duration of each such engagement, and means movable in timed relation to the sound reproducing means for operating said members in regular sequence after equal time intervals to move successively engaging members out of such engagement.

11. A machine of the character described, comprising in combination, sound reproducing means, picture projecting mechanism, a member carrying a plurality of pictures and movable to bring said pictures in succession into register with said mechanism, means movable perpendicularly of the path of movement of said picture carrying member into engagement therewith to limit the successive movements thereof, means movable in timed relation to the sound reproducing means for operating the last mentioned means intermittently to release the picture carrying member, and means on said member for determining the time intervals intervening between the successive intermittent releasing movements of said means.

12. A machine of the character described, comprising in combination, sound reproducing means, picture projecting mechanism, a member carrying a plurality of pictures and movable to bring said pictures in succession into register with said mechanism, means movable perpendicularly of the path of movement of said picture carrying member into engagement therewith to limit the successive movements thereof, means movable in timed relation to the sound reproducing means for operating the last mentioned means at regular intervals to cause the same to release the picture carrying member after irregular time intervals, and means on said member for determining the time intervals intervening between the successive intermittent releasing movements of said means.

13. A machine of the character described, comprising in combination, picture projecting mechanism, a member carrying a plurality of pictures and movable to bring said pictures in succession into register with said mechanism, a plurality of independently movable members spaced transversely of the path of movement of said member, means for retracting said members in regular sequence, and a plurality of engaging means on the picture carrying member spaced in the direction of movement and also laterally thereof and adapted to co-act with said members in a sequence different from the sequence of retraction thereof to determine the time intervals between successive movements of said member.

14. A machine of the character described, comprising in combination, picture projecting mechanism, a member carrying a plurality of pictures and movable to bring said pictures in succession into register with said mechanism, means arranged transversely of the path of movement of said member, means for intermittently operating the last mentioned means at regular intervals to permit movement of said member, and a plurality of engaging means on the picture carrying member spaced uniformly in the direction of movement of said member and also spaced non-uniformly laterally thereof said engaging means co-acting in succession with said transverse means to determine the similar and dissimilar time intervals between successive movements of said member.

15. A machine of the character described, comprising in combination, sound reproducing means, picture projecting mechanism, a member carrying a plurality of pictures and movable to bring said pictures in succession into register with said mechanism, a plurality of independently movable members spaced transversely of the path of movement of said member, means movable in timed relation to the sound reproducing means and retracting said members in sequence after equal time intervals, and a plurality of engaging means on the picture carrying member spaced in the direction of movement and also laterally thereof and adapted to co-act with said members in a sequence different from the sequence of retraction thereof to determine the time intervals between successive movements of said member.

16. A machine of the character described, comprising in combination, sound reproducing means, picture projecting mechanism, a member carrying a plurality of pictures and movable to bring said pictures in succession into register with said mechanism, means arranged transversely of the path of movement of said member, means rotatable in timed relation to the sound reproducing means and operating to retract the last mentioned means after equal amounts of rotation to permit successive movements of said member, and a plurality of engaging means on the picture carrying member spaced in the direction of movement thereof to co-act with said transverse means at the completion of said successive movements the successive engaging means being also variably spaced laterally of said member to determine the similar and dissimilar amounts of rotation of said rotatable means intervening between successive movements of said member.

17. A machine of the character described, comprising in combination, picture projecting mechanism, a slidable member having a plurality of pictures arranged longitudinally thereof and slidable to bring said pictures in succession into register with said mechanism, more than two members arranged in spaced relation transversely of said picture slide, means for operating said members in regular sequence, and a plurality of engaging means on the picture slide spaced longitudinally thereof one for each picture, each of said engaging means being spaced from the preceding one laterally of said slide a distance to co-act with a member spaced one or more spaces from the member co-acting with the preceding engaging means.

18. A machine of the character described, comprising in combination, picture projecting mechanism, a member carrying a plurality of pictures and movable to bring said pictures in succession into register with said mechanism, more than two members arranged in spaced relation transversely of the path of movement of said member, means for operating said members in regular sequence at equal time intervals, and a plurality of series of engaging means on said picture carrying member, each series corresponding in position to one of said members, each engaging means being positioned relatively to the preceding one in a series to allow one or more of said time intervals between operations of the corresponding members.

19. A machine of the character described, comprising in combination, picture projecting mechanism, a member carrying a plurality of pictures and movable to bring said pictures in succession into register with said mechanism, more than two members adapted to co-act in a particular irregular succession with said member to limit the successive movements thereof, and means irregularly positioned on the picture carrying member for determining the irregular succession in which said members co-act therewith.

20. A machine of the character described, comprising in combination, picture projecting mechanism, a member carrying a plurality of pictures and movable to bring said pictures in succession into register with said mechanism, a plurality of independently movable members movable in a particular succession to engage the picture carrying member to limit the successive movements thereof, means for moving said members away from said member in regular sequence at equal time intervals, and means on the picture carrying member operating at each movement thereof to select for limiting its next movement a member operable one or more time intervals after the preceding member.

21. A machine of the character described, comprising in combination, picture projecting mechanism, a member carrying a plurality of pictures and movable to bring said pictures in succession into register with said mechanism, a plurality of independently movable members adjacent the path of movement of the picture carrying member, means for moving said members away from said member in regular sequence at equal time intervals, and means on the picture carrying member operating at each movement thereof to engage a member which is operable by the last mentioned means one or more time intervals after the preceding member.

22. A machine of the character described, comprising in combination, sound reproducing means, picture projecting mechanism, a member carrying a plurality of pictures and movable to bring said pictures in succession into register with said mechanism, and means operating in timed relation to the sound reproducing means to control the movement of said member after successive predetermined time intervals, said means including a plurality of more than two members movable one after the other into and out of the path of the picture carrying member, a pair of said members extending at the completion of each successive movement of said member into said path, one member preventing movement of the picture carrying member and the other being in position to limit the succeeding movement of the member after withdrawal of the first member.

23. A machine of the character described, comprising in combination sound reproducing means, picture projecting mechanism, a member carrying a plurality of pictures and movable to bring said pictures in succession into register with said mechanism, and means operating in timed relation to the sound reproducing means to control the movement of said member after successive predetermined time intervals, said means including a plurality of more than two members movable one after the other in predetermined irregular sequence into the path of the picture carrying member, and movable away from said member in regular sequence after equal time intervals, a pair of said members extending at the completion of each successive movement of said member into said path, one member preventing movement of the picture carrying member and the other being in position to limit the succeeding movement of the member after withdrawal of the first member.

24. A machine of the character described, comprising in combination, sound reproducing means, picture projecting mechanism, a plurality of members mounted for free and independent movement in any desired sequence to successively prevent movement of a picture carrying member relatively to said mechanism, and means operating in timed relation to the sound reproducing means for operating said members in regular sequence to cause the same to release the picture carrying member after successive predetermined time intervals.

25. A machine of the character described, comprising in combination, sound reproducing means, picture projecting mechanism, a member carrying a plurality of pictures and movable to bring said pictures in succession into register with said mechanism, said member having controlling means, members movable independently of each other and in an irregular sequence determined by said controlling means to successively limit the movements of said picture carrying member, and means operating in timed relation to the sound reproducing means for operating said members in succession to cause the same to release the picture carrying member after successive predetermined variable time intervals.

26. A machine of the character described, comprising in combination, sound reproducing means, picture projecting mechanism, a member carrying a plurality of pictures movable to bring said pictures in succession into register with said mechanism, and having a plurality of engaging parts arranged thereon in a predetermined irregular relation, means movable toward and away from said picture carrying member to successively engage said engaging parts, and means movable in regular timed relation to the sound reproducing means for operating the last mentioned means to successively disengage the same from said engaging part on the picture carrying member to release the latter after successive predetermined irregular time intervals.

27. A machine of the character described, comprising in combination, sound reproducing means, picture projecting mechanism, a member carrying a plurality of pictures movable to bring said pictures in succession into register with said mechanism, and having a plurality of engaging parts arranged thereon in a predetermined irregular relation, means movable toward and away from said picture carrying member to successively engage said engaging parts, and means movable in regular timed relation to the sound reproducing means for controlling the last mentioned means at equal time intervals to successively disengage the same from said engaging parts on the picture carrying member to release the latter after successive predetermined similar and dissimilar time intervals.

28. A machine of the character described, comprising in combination, sound reproducing means, picture projecting mechanism, a member carrying a plurality of pictures and movable to bring said pictures in succession into register with said mechanism, a plurality of more than two independently movable members, parts on said picture carrying member adapted to co-act with said members in a succession determined by the positioning of said parts to determine the successive movements of the picture carrying member, and means operated in timed relation to the sound reproducing means for moving said members in sequence each independently of the others to withdraw successively operating members out of co-acting relation with said parts.

29. A machine of the character described, comprising in combination, sound reproducing means, picture projecting mechanism, a member carrying a plurality of pictures and movable to bring said pictures in succession into register with said mechanism, a plurality of members operated sequentially in timed relation to the sound reproducing means, and parts on said picture carrying member arranged in a predetermined irregular relation, and co-acting with said sequentially operated members to determine the successive irregular movements of the picture carrying member.

30. A machine of the character described, comprising in combination, sound reproducing means, picture projecting mechanism, a member carrying a plurality of pictures and movable to bring said pictures in succession into register with said mechanism, a plurality of members movable toward and away from the picture carrying member, means operated in regular timed relation to the sound reproducing means to actuate said members in sequence, and parts on said picture carrying member arranged in a predetermined irregular relation, and coacting with said sequentially operated members to determine the successive irregular movements of the picture carrying member.

31. A machine of the character described, comprising in combination, sound reproducing means, picture projecting mechanism, a member carrying a plurality of pictures and movable to bring said pictures in succession into register with said mechanism, a member rotatable in timed relation to said sound reproducing means, and a plurality of members operable independently of each other by said rotatable member in regular sequence after successive equal amounts of rotation thereof and means on said picture carrying member positioned relatively to said members to coact therewith in predetermined irregular order to control the successive movements of said picture carrying member after predetermined similar and dissimilar time intervals.

32. A machine of the character described, comprising in combination, sound reproducing means, picture projecting mechanism, a member carrying a plurality of pictures and movable to bring said pictures in succession into register with said mechanism, a member rotatable in timed relation to said sound reproducing means, a plurality of members operable independently of each other in regular order by said rotatable member, and a plurality of engaging parts on the picture carrying member arranged at equal intervals in the direction of movement thereof, said parts being positioned relatively to said members so as to co-act in irregular order therewith to control the successive movements of said picture carrying member after predetermined similar and dissimilar time intervals.

33. A machine of the character described, comprising in combination, sound reproducing means, picture projecting mechanism, a member carrying a plurality of pictures and movable to bring said pictures in succession into register with said mechanism, a member rotatable in timed relation to said sound reproducing means, a plurality of members operable by said rotatable member after successive predetermined equal amounts of rotation thereof, and a plurality of engaging parts on the picture carrying member arranged in a predetermined irregular relation and coacting in succession with the last mentioned members to control the successive movements of said picture carrying member.

34. A machine of the character described, comprising in combination, sound reproducing means, picture projecting mechanism, a member carrying a plurality of pictures and movable to bring said pictures in succession into register with said mechanism, engaging parts arranged in a predetermined irregular relation on the picture carrying member, a plurality of members co-acting in a predetermined order with the successive engaging parts to limit the successive movements of said member, and a rotatable member turning in timed relation to the sound reproducing means and moving said members in said predetermined order after successive predetermined irregular amounts of rotation to allow the successive movements of the picture carrying member.

35. A machine of the character described, comprising in combination, sound reproducing means, picture projecting mechanism, a member carrying a plurality of pictures and movable to bring said pictures in succession into register with said mechanism, engaging parts positioned in a predetermined relation on the picture carrying member, a plurality of members co-acting with the successive engaging parts in an irregular sequence determined by the positioning of said parts, to limit the successive movements of said member, and means operable to move said members away from said parts in regular sequence in order to disengage the successively co-acting members from said parts to allow of the successive movements of said member.

36. A machine of the character described, comprising in combination, sound reproducing means, picture projecting mechanism, a member carrying a plurality of pictures and movable to bring said pictures in succession into register with said mechanism, engaging parts arranged in a predetermined irregular relation on the picture carrying member, and a plurality of members movable in a predetermined order to engage with successive engaging parts to limit the successive movements of said member, and movable in said predetermined order to disengage from said parts after irregular time intervals to allow of the successive movements of said member.

37. A machine of the character described, comprising in combination, sound reproducing means, picture projecting mechanism, a member carrying a plurality of pictures and movable to bring said pictures in succession into register with said mechanism, a plurality of slidable plungers, means tending normally to hold said plungers in advanced positions, parts on said picture carrying member adapted to engage predetermined plungers after successive movements of said member, and means operating in timed relation to the sound reproducing means to retract said plungers to disengage the same from said parts in a predetermined order after successive predetermined time intervals.

38. A machine of the character described, comprising in combination, sound reproducing means, picture projecting mechanism, a member carrying a plurality of pictures and movable to bring said pictures in succession into register with said mechanism, a plurality of slidable plungers, means tending normally to hold said plungers in advanced positions, parts arranged in predetermined irregular relation on said picture carrying member, adapted to engage predetermined plungers after successive movements of said member, and means operating in timed relation to the sound reproducing means to retract said plungers to disengage the same from said parts in a predetermined irregular order after successive predetermined irregular time intervals.

39. A machine of the character described, comprising in combination, sound reproducing means, picture projecting mechanism, a member carrying a plurality of pictures and movable to bring said pictures in succession into register with said mechanism, a plurality of slidable plungers, means tending normally to hold said plungers in advanced positions, parts arranged in a predetermined relation on said picture carrying member adapted to engage predetermined plungers after successive movements of said member, and means operating in timed relation to the sound reproducing means to retract said plungers in regular sequence to disengage the same from said parts in a predetermined order after successive predetermined time intervals.

40. A machine of the character described, comprising in combination, sound reproducing means, picture projecting mechanism, a plurality of more than two pivoted levers mounted for free and independent movement in irregular sequence into positions to limit the successive movements of a picture carrying member and means operating to retract said levers from said position in the same sequence.

41. A machine of the character described, comprising in combination, sound reproducing means, picture projecting mechanism, a plurality of more than two pivoted levers mounted for free and independent movement in irregular sequence into position to limit the successive movements of a picture carrying member relatively to said mechanism, and means operating in timed relation to the sound reproducing means to move said levers in regular sequence to allow movement of said member.

42. A machine of the character described, comprising in combination, sound reproducing means, picture projecting mechanism, a plurality of pivoted levers mounted for free and independent movement in any desired sequence, means separate from but operated by said levers when so moved to limit the successive movements of a picture carrying member relatively to said mechanism, and means operating in timed relation to the sound reproducing means to move said levers to retract the second mentioned means to allow said movements of said member.

43. A machine of the character described, comprising in combination, sound reproducing means, picture projecting mechanism, a plurality of pivoted levers mounted for free and independent movement in any desired sequence, means separate from but operated by said levers when so moved to limit the successive movements of a picture carrying member relatively to said mechanism and means operating in timed relation to the sound reproducing means to operate said levers in regular sequence to retract the second mentioned means out of co-acting relation with said member to allow movement thereof.

44. A machine of the character described, comprising in combination, sound reproducing means, picture projecting mechanism, a member carrying a plurality of pictures and movable to bring said pictures in succession into register with said mechanism, engaging parts arranged in a predetermined relation on said picture carrying member, a plurality of members movable independently of each other and adapted to co-act with said engaging parts in a sequence predetermined by the arrangement of said parts on said member to control the successive movements of said member, and means rotatable in timed relation to the sound reproducing means and operating said members one after the other in regular sequence after successive equal amounts of rotation thereof.

45. A machine of the character described, comprising in combination, sound reproducing means, picture projecting mechanism, a member carrying a plurality of pictures and movable to bring said pictures in succession into register with said mechanism, engaging parts arranged in a predetermined relation on said picture carrying member, a plurality of independently movable members adapted to co-act with said engaging parts in a sequence predetermined by the arrangement of said parts on said member to control the successive movements of said member, a plurality of independently movable levers one for each member, and means rotatable in timed relation to the sound reproducing means and moving said levers in succession to operate said members in sequence after successive equal amounts of rotation thereof.

46. A machine of the character described, comprising in combination, sound reproducing means, picture projecting mechanism, a member carrying a plurality of pictures and movable to bring said pictures in succession into register with said mechanism, engaging parts arranged in a predetermined relation on said picture carrying members, a plurality of independently movable members adapted to co-act with said engaging parts in a sequence predetermined by the arrangement of said parts on said member to control the successive movements of said member, a shaft rotating in timed relation to the sound reproducing means, and a cam disc on said shaft adapted to cause operation of said members independently and in sequence after equal amounts of rotation of said shaft.

47. A machine of the character described, comprising in combination, sound reproducing means, picture projecting mechanism, a member carrying a plurality of pictures and movable to bring said pictures in succession into register with said mechanism, a plurality of independently movable members adapted to coact with engaging parts arranged in a predetermined relation on said picture carrying member to control the successive movements of said member, a shaft rotating in timed relation to the sound reproducing means, and a plurality of cam discs secured to said shaft each adapted to control the operation of a plurality of said members, said discs together causing independent sequential movement of said members after equal amounts of rotation of said shaft.

48. A machine of the character described, comprising in combination, sound reproducing means, picture projecting mechanism, a member carrying a plurality of pictures and movable to bring said pictures in succession into register with said mechanism, a plurality of independently movable members adapted to co-act with engaging parts arranged in a predetermined relation on said picture carrying member to control the successive movements of said member, a shaft rotating in timed relation to the sound reproducing means, and means on said shaft having a plurality of angularly spaced pins each individual to one of said members and operating the same at each revolution of the shaft, said pins causing operation of said members in sequence after equal amounts of rotation of said shaft.

49. A machine of the character described, comprising in combination, sound reproducing means, picture projecting mechanism, a member carrying a plurality of pictures and movable to bring said pictures in succession into register with said mechanism, a plurality of independently movable members adapted to coact with engaging parts arranged in a predetermined relation on said picture carrying member to control the successive movements of said member, a shaft rotating in timed relation to the sound reproducing means, and a plurality of members secured to said shaft carrying pins each individual to one of said independently movable members, said pins all being spaced from each other equal angular distances and adapted to cause independent operation of said members in sequence after equal amounts of rotation of said shaft.

50. A machine of the character described, comprising in combination, sound reproducing means, picture projecting mechanism, including illuminating means, a member carrying a plurality of pictures and movable to bring said pictures in succession into register with said mechanism, means operating in timed relation to the sound reproducing means to control the movement of said member after successive predetermined time intervals, and a single means operable to simultaneously throw the last mentioned means and said illuminating means into and out of operation.

51. A machine of the character described, comprising in combination, sound reproducing means, picture projecting mechanism, a member carrying a plurality of pictures and movable to bring said pictures in succession into register with said mechanism, means operating in timed relation to the sound reproducing means to control the movement of said member after successive predetermined time intervals, a stop, and means operable to throw the last mentioned means into or out of operation and to simultaneously move said stop out of or into the path of movement of the picture carrying member.

52. A machine of the character described, comprising in combination, sound reproducing means, picture projecting mechanism, a member carrying a plurality of pictures and movable to bring said pictures in succession into register with said mechanism, means including a member rotatable in timed relation to the sound reproducing means, operating after successive predetermined amounts of rotation of said member to control the movements of the picture carrying member, means operable to disconnect said rotatable member from its driving means and means independent of said driving means for returning the rotatable member to a predetermined position.

53. A machine of the character described, comprising in combination, sound reproducing mechanism, picture projecting mechanism including illuminating means, a member carrying a plurality of pictures and movable to bring said pictures in succession into register with said projecting mechanism, means operating to control the successive movements of the said member, means operating in timed relation to the sound reproducing mechanism for controlling the last mentioned means, a stop, and a single means operable to simultaneously throw the two last mentioned means and the illuminating means into or out of operation and to simultaneously move said stop out of or into the path of the picture carrying member.

54. A machine of the character described, comprising in combination, sound reproducing mechanism, picture projecting mechanism including illuminating means, a member carrying a plurality of pictures and movable to bring said pictures in succession into register with said projecting mechanism, means operating to control the successive movements of the said member, means operating in timed relation to the sound reproducing mechanism for controlling the last mentioned means, a stop, a single means operable to simultaneously throw the two last mentioned means and the illuminating means into or out of operation and to simultaneously move said stop into or out of the path of the picture carrying member, and means operable to return the second mentioned controlling means into a predetermined position when thrown out of operation.

55. A machine of the character described, comprising in combination, picture projecting mechanism, a plurality of members movable independently of each other in one direction to limit the successive movements of a picture carrying member relatively to said mechanism, means controlling the sequence of the movements of said members in said direction, and means operable to move said members in the opposite direction one after the other in regular sequence.

56. A machine of the character described, comprising in combination, picture projecting mechanism, a plurality of members movable independently of each other in one direction to limit the successive movements of a picture carrying member relatively to said mechanism, means controlling the sequence of the movements of said members in said direction, and means operable to move said members in the opposite direction one after the other in regular sequence, the successively operating members each being positioned to limit the movements of the picture carrying member prior to the movement of the preceding member in the opposite direction.

57. A machine of the character described, comprising in combination, picture projecting mechanism, a member carrying a plurality of pictures and movable to bring said pictures in succession into register with said mechanism, a plurality of more than two independently movable members adapted to be moved in succession into positions to limit the successive movements of the picture carrying member, a pair of said members occupying limiting positions at each movement of said member, means operating at successive time intervals to move one member of said pair out of limiting position to allow movement of said picture carrying member until stopped by the other of said members, and means operating at each such movement to move another member into position to limit the next movement of said picture carrying member.

58. A machine of the character described, comprising in combination, picture projecting mechanism, a member carrying a plurality of pictures and movable to bring said pictures in succession into register with said mechanism, a plurality of more than two independently movable members adapted to be moved in succession into positions to limit the successive movements of the picture carrying member, a pair of said members occupying limiting positions at each movement of said member, means operating at successive time intervals to move one member of said pair out of limiting position to allow movement of said picture carrying member until stopped by the other of said members, and means on the picture carrying member operating at each such movement thereof to select another member for movement into position to limit the next movement of said picture carrying member.

59. A machine of the character described, comprising in combination, picture projecting mechanism, a plurality of substantially parallel members movable independently of each other in the same direction to limit the successive movements of a picture carrying member relatively to said mechanism, a plurality of pivoted levers operatively connected with said members, and means operable to move said levers one after the other in regular sequence to cause the same to retract said members in the opposite direction in regular sequence.

60. A machine of the character described, comprising in combination, sound reproducing means, picture projecting mechanism, a plurality of substantially parallel members movable independently of each other in the same direction to limit the successive movements of a picture carrying member relatively to said mechanism, a shaft rotating in timed relation to the sound reproducing means, and a cam disc on said shaft having a plurality of projections adapted to cause independent movement of said members in the opposite direction one after the other in regular sequence after equal amounts of rotation of said shaft.

61. A machine of the character described, comprising in combination, sound reproducing means, picture projecting mechanism, a plurality of substantially parallel members movable independently of each other in the same direction to limit the successive movements of a picture carrying member relatively to said mechanism, a shaft rotating in timed relation to the sound reproducing means, and means on said shaft having a plurality of angularly spaced pins each individual to one of said members, said pins causing independent movement of said members in the opposite direction one after the other in regular sequence after equal amounts of rotation of said shaft.

62. A machine of the character described, comprising in combination, sound reproducing means, picture projecting mechanism, a plurality of substantially parallel members movable independently of each other in the same direction to limit the successive movements of a picture carrying member relatively to said mechanism, means operable to move said members in the opposite direction one after the other in regular sequence, a stop, and means for moving all of said members together in said opposite direction and for simultaneously moving said stop into position to prevent movement of a subsequent picture carrying member.

63. For use in a machine of the character described, a member having a plurality of pictures arranged longitudinally thereof, and having a plurality of more than two longitudinal series of engaging means, there being one engaging means for each picture, each such means being in one of said series and spaced longitudinally from the adjacent means a distance equal to that between the corresponding edges of adjacent pictures.

64. For use in a machine of the character described, a member having a plurality of pictures arranged longitudinally thereof, and having a plurality of engaging means one for each picture, said means being uniformly spaced longitudinally of the member and irregularly spaced laterally thereof, said member having recesses extending longitudinally in advance of said engaging means uniform distances greater than the distance between corresponding lateral edges of adjacent pictures.

65. For use in a machine of the character described, a member having a plurality of pictures arranged longitudinally thereof, and having a plurality of slots one for each picture, said slots being irregularly spaced laterally of said member and having their rearmost ends uniformly spaced from each other a distance equal to that between the corresponding edges of adjacent pictures.

66. For use in a machine of the character described, a member having a plurality of pictures arranged serially thereon, and having a plurality of engaging means one for each picture, said means being uniformly spaced in the direction of the serial arrangement of the pictures and irregularly spaced laterally of such direction, said member having recesses extending in said direction in advance of said means a distance greater than that between corresponding edges of adjacent pictures.

67. For use in a machine of the character described, a member having a plurality of pictures arranged serially thereon, and having a plurality of slots one for each picture, the rearmost edges of said slots with respect to the direction of the serial arrangement of the pictures being uniformly spaced a distance equal to that between the corresponding edges of adjacent pictures and the successive slots being spaced transversely of said direction varying distances.

68. For use in a machine of the character described, a member having a plurality of pictures arranged serially thereon, and having a plurality of slots one for each picture, the rearmost edges of said slots with respect to the direction of the serial arrangement of the pictures being uniformly spaced a distance equal to that between the corresponding edges of adjacent pictures and overlapping the foremost edges of succeeding slots, and said slots being irregularly spaced from each other laterally of said direction.

69. For use in a machine of the character described, a member having a plurality of pictures arranged serially thereon, and having a plurality of engaging means one for each picture, said means being uniformly spaced in the direction of the serial arrangement of the pictures and irregularly spaced laterally of such direction, each engaging means being arranged at one side or the other of the preceding means in a selective arrangement individual to said member to provide more than two series of said means.

70. For use in a machine of the character described, a member having a plurality of pictures arranged serially thereon, and having a plurality of more than two series of engaging means extending in the direction of the serial arrangement of said pictures and spaced laterally of such direction, the engaging means being uniformly spaced in said direction and each being arranged in a series spaced one, two or more lateral spaces from that in which the preceding means is arranged.

In testimony whereof we affix our signatures in presence of two witnesses.

GUSTAV BOHN.
HERMAN ALBERT BREINING.

Witnesses:
  FRED. T. KOEHLER,
  HARRY JOSEPH ALPIGINI.